United States Patent
Komon et al.

(10) Patent No.: US 9,695,490 B2
(45) Date of Patent: Jul. 4, 2017

(54) REFINING AGENTS FOR ALKALINE EARTH PRODUCTION

(71) Applicant: Lixivia, Inc., Santa Barbara, CA (US)

(72) Inventors: Zachary J. A. Komon, San Diego, CA (US); Michael D. Wyrsta, Santa Barbara, CA (US)

(73) Assignee: LIXIVIA, INC., Santa Barbara, CA (US)

(*) Notice: Subject to any disclaimer, the term of this patent is extended or adjusted under 35 U.S.C. 154(b) by 294 days.

(21) Appl. No.: 14/073,503

(22) Filed: Nov. 6, 2013

(65) Prior Publication Data

US 2014/0134084 A1    May 15, 2014

Related U.S. Application Data

(60) Provisional application No. 61/796,371, filed on Nov. 7, 2012, provisional application No. 61/797,354, filed on Dec. 4, 2012, provisional application No. 61/855,443, filed on May 14, 2013.

(51) Int. Cl.
*C22B 26/20* (2006.01)
*C22B 3/28* (2006.01)

(52) U.S. Cl.
CPC ............. *C22B 26/20* (2013.01); *C22B 3/001* (2013.01); *Y02P 10/234* (2015.11)

(58) Field of Classification Search
None
See application file for complete search history.

(56) References Cited

U.S. PATENT DOCUMENTS

| 5,939,034 A | 8/1999 | Virnig et al. |
| 6,951,960 B2 | 10/2005 | Perraud |
| 2004/0228783 A1 | 11/2004 | Harris et al. |

FOREIGN PATENT DOCUMENTS

| EP | 1309392 B1 | 7/2006 |
| JP | 2005-097072 A | 4/2005 |
| WO | 2012-055750 A1 | 7/2012 |
| WO | 2012-055750 A4 | 7/2012 |

OTHER PUBLICATIONS

Kodama, Satoshi, et al., "Development of a New Ph-Swing CO2 Mineralization Process With a Recyclable Reaction Solution," Energy 33 (2008) 776-784, 9 pages.

*Primary Examiner* — Melissa Swain
(74) *Attorney, Agent, or Firm* — Fish & Tsang, LLP

(57) ABSTRACT

Hydrometallurgical systems, methods, and compositions are described in which organic amine-based lixiviants are utilized in the selective recovery of alkaline earth elements. The lixiviant can be regenerated and recycled for use in subsequent iterations of the process. Multiple alkaline earth elements can be recovered from a sample in parallel or in serial applications of the disclosed methods.

18 Claims, 14 Drawing Sheets

| Mineral | Wt. % |
| --- | --- |
| $SiO_2$ | 11.8 |
| $Al_2O_3$ | 4.9 |
| $Fe_2O_3$ | 29.7 |
| $MgO$ | 9.58 |
| $CaO$ | 35.5 |
| $Na_2O$ | 0.05 |
| $K_2O$ | 0.03 |
| $TiO_2$ | 0.35 |
| $P_2O_5$ | 0.50 |
| $MnO$ | 3.78 |
| $Cr_2O_3$ | 0.25 |
| $V_2O_5$ | 0.15 |

FIG. 5

REFINING AGENTS FOR ALKALINE EARTH PRODUCTION

This application claims priority to U.S. Provisional Application No. 61/796,371, filed Nov. 7, 2012; U.S. Provisional Application No. 61/797,354, filed Dec. 4, 2012; and U.S. Provisional Application No. 61/855,443, filed May 14, 2013. These and all other referenced extrinsic materials are incorporated herein by reference in their entirety.

FIELD OF THE INVENTION

The field of the invention is hydrometallurgy, particularly as it is related to the extraction or recovery of alkaline earth elements.

BACKGROUND

The following description includes information that may be useful in understanding the present invention. It is not an admission that any of the information provided herein is prior art or relevant to the presently claimed invention, or that any publication specifically or implicitly referenced is prior art.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

There is a long-standing need to efficiently and cost-effectively recover commercially valuable metals from low yield sources, such as mine tailings.

Historically, it has been especially desirable to recover alkaline earth elements. Alkaline earth elements, also known as beryllium group elements, include beryllium (Be), magnesium (Mg), calcium (Ca), strontium (Sr), barium (Ba) and radium, (Ra), which range widely in abundance. Applications of these commercially important metals also vary widely, and include uses as dopants in electronic components, structural materials, and in the production foods and pharmaceuticals.

Methods of isolating of one member of the alkaline earth family, calcium, from minerals such as limestone, have been known since ancient times. In a typical process limestone is calcined or otherwise roasted to produce calcium oxide (CaO), or quicklime. This material can be reacted with water to produce calcium hydroxide ($Ca(OH)_2$), or slaked lime. Calcium hydroxide, in turn, can be suspended in water and reacted with dissolved carbon dioxide ($CO_2$) to form calcium carbonate ($CaCO_3$), which has a variety of uses. Approaches that have been used to isolate other members of this family of elements often involve the production of insoluble hydroxides and oxides using elevated temperatures or strong acids. Such approaches, however, are not suitable for many sources of alkaline earth elements (such as steel slag), and are not sufficiently selective to be readily applied to mixtures of alkaline earth elements.

Hydrometallurgy can also been used to isolate metals from a variety of minerals, ores, and other sources. Typically, ore is crushed and pulverized to increase the surface area prior to exposure to the solution (also known as a lixiviant). Suitable lixiviants solubilize the desired metal, and leave behind undesirable contaminants. Following collection of the lixiviant, the metal can be recovered from the solution by various means, such as by electrodeposition or by precipitation from the solution.

Previously known methods of hydrometallurgy have several problems. Identification of lixiviants that provide efficient and selective extraction of the desired metal or metals has been a significant technical barrier to their adoption in the isolation of some metals. Similarly, the expense of lixiviant components, and difficulties in adapting such techniques to current production plants, has limited their use.

Approaches have been devised to address these issues. United States Patent Application No. 2004/0228783 (to Harris, Lakshmanan, and Sridhar) describes the use of magnesium salts (in addition to hydrochloric acid) as a component of a highly acidic lixiviant used for recovery of other metals from their oxides, with recovery of magnesium oxide from the spent lixiviant by treatment with peroxide. Such highly acidic and oxidative conditions, however, present numerous production and potential environmental hazards that limit their utility. In an approach disclosed in U.S. Pat. No. 5,939,034 (to Virnig and Michael), metals are solubilized in an ammoniacal thiosulfate solution and extracted into an immiscible organic phase containing guanidyl or quaternary amine compounds. Metals are then recovered from the organic phase by electroplating.

A similar approach is disclosed in U.S. Pat. No. 6,951,960 (to Perraud) in which metals are extracted from an aqueous phase into an organic phase that contains an amine chloride. The organic phase is then contacted with a chloride-free aqueous phase that extracts metal chlorides from the organic phase. Amines are then regenerated in the organic phase by exposure to aqueous hydrochloric acid. Application to alkaline earth elements (for example, calcium) is not clear, however, and the disclosed methods necessarily involve the use of expensive and potentially toxic organic solvents.

In a related approach, European Patent Application No. EP1309392 (to Kocherginsky and Grischenko) discloses a membrane-based method in which copper is initially complexed with ammonia or organic amines. The copper:ammonia complexes are captured in an organic phase contained within the pores of a porous membrane, and the copper is transferred to an extracting agent held on the opposing side of the membrane. Such an approach, however, requires the use of complex equipment, and processing capacity is necessarily limited by the available surface area of the membrane.

Methods for capturing $CO_2$ could be used to recover alkaline earth metals, but to date no one has appreciated that such could be done. Kodama et al. (Energy 33 (2008), 776-784) discloses a method for $CO_2$ capture using a calcium silicate ($2CaO.SiO_2$) in association with ammonium chloride ($NH_4Cl$). This reaction forms soluble calcium chloride ($CaCl_2$), which is reacted with carbon dioxide ($CO_2$) under alkaline conditions to form insoluble calcium carbonate ($CaCO_3$) and release chloride ions (Cl—).

Kodama et al. uses clean forms of calcium to capture $CO_2$, but is silent in regard to the use of other alkaline earth elements in this chemistry. That makes sense from Kodoma et al.'s disclosure, which notes that a high percentage (approximately 20%) of the $NH_4Cl$ used is lost in the disclosed process, requiring the use of additional equipment to capture ammonia vapor. This loss results in significant process inefficiencies, and raises environmental concerns. Japanese Patent Application No. 2005097072 (to Katsunori and Tateaki) discloses a similar method for $CO_2$ capture, in which ammonium chloride ($NH_4Cl$) is dissociated into ammonia gas ($NH_3$) and hydrochloric acid (HCl), the HCl being utilized to generate calcium chloride ($CaCl_2$) that is mixed with ammonium hydroxide ($NH_4OH$) for $CO_2$ capture.

International Application WO 2012/055750 (to Tavakkoli et al) discloses a method for purifying calcium carbonate ($CaCO_3$), in which impure $CaCO_3$ is converted to impure calcium oxide (CaO) by calcination. The resulting CaO is treated with ammonium chloride ($NH_4Cl$) to produce calcium chloride ($CaCl_2$), which is subsequently reacted with high purity carbon dioxide ($CO_2$) to produce $CaCO_3$ and $NH_4Cl$, with $CaCO_3$ being removed from the solution by crystallization with the aid of seed crystals. Without means for capturing or containing the ammonia gas that would result from such a process, however, it is not clear if the disclosed method can be adapted to an industrial scale.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for a hydrometallurgical method that provides simple and economical isolation of metal hydroxide forming species.

SUMMARY OF THE INVENTION

The inventive subject matter provides apparatus, systems and methods in which an organic amine cation/counterion anion complex that is soluble in a polar solvent is used in a lixiviant for use in the recovery of alkaline earth elements. The organic amine cation/counterion anion complex transfers the counterion to an insoluble alkaline earth hydroxide, generating a soluble alkaline earth cation/counterion complex and an uncharged organic amine. The organic amine cation/counterion anion complex can be regenerated by the addition of a precipitant, which also reacts with the alkaline earth cation to form an insoluble alkaline earth salt. The organic amine component of the organic amine cation/counterion anion complex can be chosen to provide selective solubilization of alkaline earth elements.

One group of embodiments of the inventive concept are methods for extracting alkaline earth elements, in which a sample is mixed or otherwise contacted with a lixiviant that contains an organic amine in the form of an organic amine cation paired with a counterion. In some embodiments the lixiviant is formed by adding an acid to an uncharged organic amine that is in contact with the sample. The organic amine is preferably a weak base, and can be obtained from a biological source. A supernatant is formed that includes a soluble alkaline earth cation complexed with the counterion and uncharged organic amine. The alkaline earth element is transferred or recovered from the supernatant and the organic amine cation regenerated by the addition of a precipitant, for example $CO_2$ or carbonic acid. During regeneration of the organic amine cation the pH can be acidic, i.e., less than about 7. Such a regenerated organic amine cation or a portion thereof can be treated with a multi-effect evaporator in some embodiments.

Another group of embodiments of the inventive concept are methods for sequentially recovering two or more alkaline earth elements from a sample using organic amine containing lixiviants. A sample containing two or more alkaline earth elements is contacted with a first lixiviant (i.e., a first organic amine and a first counterion) resulting in a first supernatant and a depleted sample. The first supernatant includes an uncharged first organic amine and a first complex, which includes a first alkaline earth element cation and a first counterion. The first alkaline earth element cation are transferred from the depleted sample, for example by removing the first supernatant, and the depleted sample is further processed. The depleted sample can be contacted with a second lixiviant, which includes a second organic amine cation and a second counterion. This yields a second supernatant, which includes an uncharged second organic amine and a second complex, which includes a second alkaline earth element cation and a second counterion. The second alkaline earth element can be recovered by transferring the second alkaline earth cation from the second supernatant. In some embodiments of the inventive concept the first organic amine cation is regenerated by the addition of a first precipitant (for example, $CO_2$ or carbonic acid), which also precipitates the first alkaline earth element for recovery. Similarly, the second organic amine cation can be regenerated by the addition of a second precipitant, which precipitates the second alkaline earth element for recovery. In some embodiments of the inventive concept the first precipitant and the second precipitant are the same species.

Yet another group of embodiments of the inventive concept are methods for extracting two or more alkaline earth elements simultaneously from a sample using an organic amine containing lixiviant. In such embodiments a sample containing two or more alkaline earth elements is contacted with a lixiviant solution that includes a first organic amine cation, a second organic amine cation, and a counterion. In some embodiments of the inventive concept, the first organic amine cation and the second organic amine cation are the same species; in other embodiments of the inventive concept the first organic amine cation and the second organic amine cation are different species. The resulting first supernatant includes an uncharged first organic amine, an uncharged second organic amine, a first complex (i.e., a first alkaline earth metal cation complexed with a counterion) and a second complex (i.e., a second alkaline earth metal cation complexed with a counterion). A second supernatant is formed by transferring the first alkaline earth metal cation from the first supernatant, for example by precipitation of the first alkaline earth element. The second alkaline earth metal cation is then transferred from this second supernatant, for example by precipitation of the second alkaline earth element. The first organic amine cation and the second organic amine cation are regenerated during these processes.

In some embodiments the first organic amine cation is regenerated by the addition of a first precipitant, which serves to precipitate the first alkaline earth element from the first supernatant, and the second organic amine cation is regenerated by the addition of a second precipitant, which serves to precipitate the second alkaline earth element from the second supernatant. In some of these embodiments the first precipitant and the second precipitant are different species chosen to selectively precipitate the first alkaline earth element and the second alkaline earth element, respectively. Alternatively, in other such embodiments the first precipitant and the second precipitant are the same species utilized at different concentrations and/or at different temperatures.

Yet another embodiment of the inventive concept is a lixiviant for extracting alkaline earth elements. Such a lixiviant includes an organic amine cation and a counterion. The organic amine cation is formulated to transfer the counterion to an insoluble salt form of an alkaline earth element (for example, a hydroxide) to form a soluble alkaline earth cation/counterion pair and an uncharged organic amine. The uncharged organic amine is capable of reacting with a precipitant (for example, $CO_2$ or carbonic acid) to regenerate the organic amine cation. Such an organic amine can have a pKa between about 8 and about 14. In some embodiments the organic amine has a vapor pressure that is less than about 1% of that of ammonia. In other embodiments the organic amine can have a vapor pressure that is less than about 0.1% of that of ammonia.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 5 illustrates the composition of a steel slag.

FIG. 7A shows pH changes over time as an alkaline earth element is extracted from a low grade source using an organic amine lixiviant. FIG. 7B shows pH changes over time as an alkaline earth element is extracted from a low grade source using a different organic amine lixiviant. FIG. 7C shows pH changes over time as an extracted alkaline earth element is recovered through the use of a precipitant. FIG. 7D is a photomicrograph of a precipitated calcium carbonate product of systems, methods, and compositions of the inventive concept.

FIG. 8A depicts components and material flow in a prior art processing plant. FIG. 8B depicts components and material flow in a processing plant that has been modified to perform a process of the inventive concept. FIG. 8C depicts the use of multi-effect evaporators in a modified plant such as that shown in FIG. 8B. FIG. 8D and FIG. 8E schematically depict exemplary mass balances and reaction conditions for processes of the inventive concept applied to steel slag and to lime, respectively.

DETAILED DESCRIPTION

Figure 1:
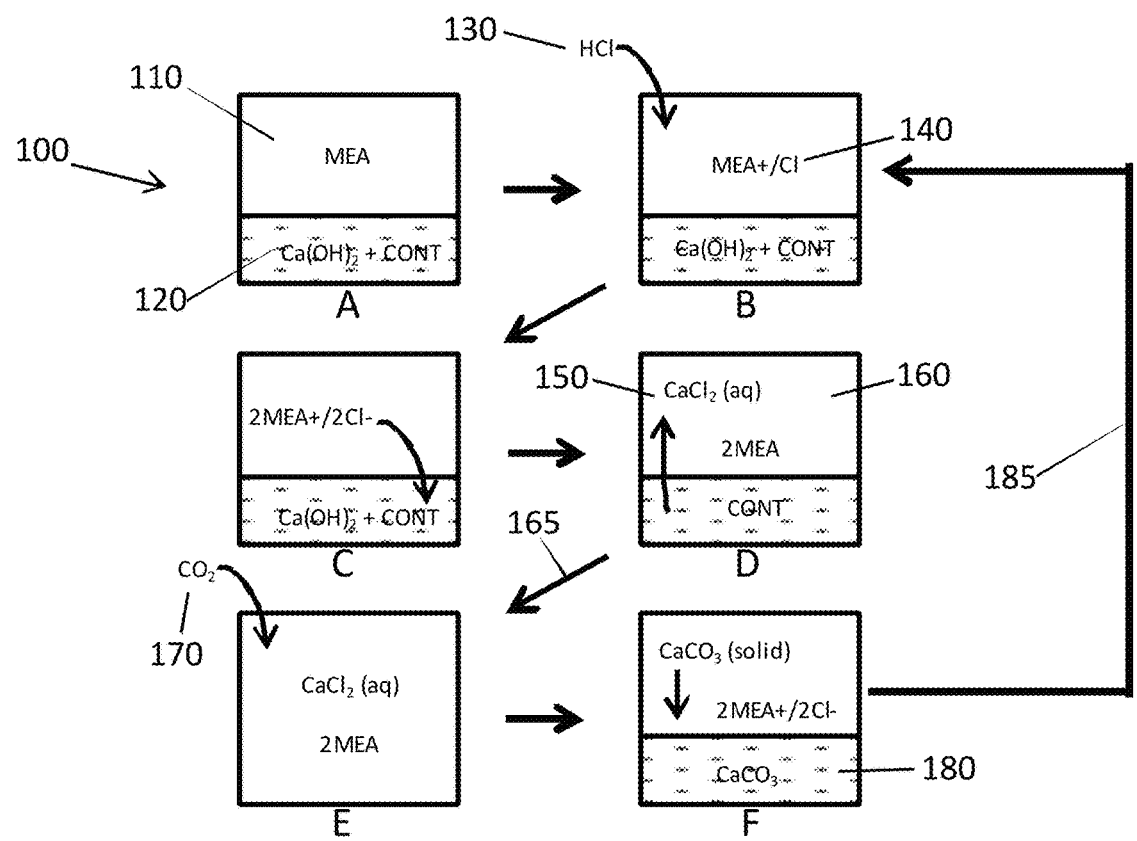
FIG. 1A to FIG. 1F depict an example of a method of the inventive concept in which calcium is recovered from a sample, using an organic amine chloride lixiviant that is regenerated.

Throughout the following discussion, numerous references will be made regarding lixiviants. A lixiviant should be understood to be a chemical entity that has the ability to selectively extract metals or metal ions from inorganic or organic solids in an aqueous or other solvent mixture.

The following discussion provides many exemplary embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The inventors have discovered a hydrometallurgical method for the recovery of alkaline earth elements (i.e., alkaline earth metals), such as members of the alkaline earth family, through the use of lixiviants that include organic amines. In addition the inventors have determined that such organic amine-based lixiviants can be regenerated using carbon dioxide. In addition, the selectivity of certain organic amines can permit stepwise isolation of different alkaline earth elements from the same sample.

Embodiments of the inventive process can include at least one compound of the general composition depicted in Compound 1 for use with any source of material that contains one or more a form(s) of a alkaline earth (AE) hydroxide forming species, that can be hydrated to form $AE(OH)_x$ or other hydrated species that would react with lixiviants of the form found in Equation 1. Alternatively, alkaline earth elements can be presented as oxides, for example calcium oxide (CaO), that can form hydroxides on reaction with water. Such hydrated forms may be present in the material as it is obtained from nature or can be introduced by processing (for example through treatment with a base, hydration, or by oxidation), and can be stable or transient. Selective extraction of the desired alkaline earth can be based on the presence of a metal hydroxide that has a stronger basicity than the organic amine-based lixiviants used in the extraction process.

Organic amines of the inventive concept have the general formula shown in Compound 1, where N is nitrogen, H is hydrogen, and X is a counterion (i.e., a counter anion).

$$Ny,R_1,R_2,R_3,H-Xz \qquad \text{Compound 1}$$

Suitable counterions can be any form or combination of atoms or molecules that produce the effect of a negative charge. Counterions can be halides (for example fluoride, chloride, bromide, and iodide), anions derived from mineral acids (for example nitrate, phosphate, bisulfate, sulfate, silicates), anions derived from organic acids (for example carboxylate, citrate, malate, acetate, thioacetate, propionate and, lactate), organic molecules or biomolecules (for example acidic proteins or peptides, amino acids, nucleic acids, and fatty acids), and others (for example zwitterions and basic synthetic polymers). For example, monoethanolamine hydrochloride (MEA.HCl, $HOC_2H_4NH_3Cl$) conforms to Compound 1 as follows: one nitrogen atom ($N_1$) is bound to one carbon atom ($R_1=C_2H_5O$) and 3 hydrogen atoms ($R_2$, $R_3$ and H), and there is one chloride counteranion ($X_1$=Cl—). Compounds having the general formula shown in Compound 1 can have a wide range of acidities, and an organic amine of the inventive concept can be selected on the basis of its acidity so that it can selectively react with one or more alkaline earth metal salts or oxides from a sample containing a mixture of alkaline earth metal salts or oxides. Such a compound, when dissolved in water or another suitable solvent, can (for example) effectively extract the alkaline earth element calcium presented in the form calcium hydroxide in a suitable sample (e.g. steel slag). Equation 1 depicts a primary chemical reaction in extracting an insoluble alkaline earth (AE) salt (in this instance a hydroxide salt) from a matrix using an organic amine cation (OA-H+)/counterion (Cl—) complex (OA-H+/Cl—) as a lixiviant. Note that the OA-H+/Cl— complex dissociates in water into OA-H+ and Cl—.

$$AE(OH)_2(solid)+2OA-H+(aq)+2Cl-(aq)\rightarrow AECl_2(aq)+2OA(aq)+2H_2O \qquad \text{Equation 1}$$

The counterion (Cl—) is transferred from the organic amine cation (OA-H+) to the alkaline earth salt to form a soluble alkaline earth/counterion complex ($AECl_2$), uncharged organic amine (OA), and water. Once solubilized the alkaline earth/counterion complex can be recovered from solution by any suitable means. For example, addition of a second counterion (SC) in an acid form (for example. $H_2SC$), which reacts with the alkaline earth cation/counterion complex to form an insoluble alkaline earth salt (AESC), can be used to precipitate the extracted alkaline earth from supernatant and release the counterion to regenerate the organic amine cation/counterion pair, as shown in Equation 2.

$$AECl_2(aq)+2OA(aq)+H_2SC\rightarrow AESC\ salt(solid)+ \\ 2OA+(aq)+2Cl— \qquad \text{Equation 2}$$

Examples of suitable second counterions include polyvalent cations, for example carbonate (which can be supplied as $CO_2$), sulfate, sulfite, chromate, chlorite, and hydrogen phosphate.

Alternatively, pH changes, temperature changes, or evaporation can be used to precipitate the solubilized alkaline earth. In some embodiments, the alkaline earth element can be recovered by electrodeposition processes, such as electrowinning or electrorefining. In other embodiments of the inventive concept the solubilized alkaline earth element can be recovered by ion exchange, for example using a fixed bed reactor or a fluidized bed reactor with appropriate media.

In a preferred embodiment of the inventive concept, the alkaline earth element can be recovered by precipitation through reaction of the mixture with carbon dioxide ($CO_2$), which advantageously regenerates the lixiviant as shown below. It should be appreciated that the process of recovering the alkaline earth element can be selective, and that such selectivity can be utilized in the recovery of multiple alkaline earth elements from a single source as described below.

The organic amine cation/counterion complex can be produced from the uncharged organic amine to regenerate the OA-H+/Cl— lixiviant, for example using an acid form of the counterion (H—Cl), as shown in Equation 3.

$$OA(aq)+H—Cl(aq)\rightarrow OA-H+(aq)+Cl— \qquad \text{Equation 3}$$

In some embodiments of the inventive concept the reaction described in Equation 3 can be performed after the introduction of an uncharged organic amine to a source of an alkaline earth element, with the lixiviant being generated afterwards by the addition of an acid form of the counterion. This advantageously permits thorough mixing of the alkaline earth source with a lixiviant precursor prior to initiating the reaction.

Organic amines suitable for the extraction of alkaline earth elements (for example from calcium containing or, steel slag, and other materials) can have a pKa of about 7 or about 8 to about 14, and can include protonated ammonium salts (i.e., not quaternary). Examples of suitable organic amines for use in lixiviants include weak bases such as ammonia, nitrogen containing organic compounds (for example monoethanolamine, diethanolamine, triethanolamine, morpholine, ethylene diamine, diethylenetriamine, triethylenetetramine, methylamine, ethylamine, propylamine, dipropylamines, butylamines, diaminopropane, triethylamine, dimethylamine, and trimethylamine), low molecular weight biological molecules (for example glucosamine, amino sugars, tetraethylenepentamine, amino acids, polyethyleneimine, spermidine, spermine, putrecine, cadaverine, hexamethylenediamine, tetraethylmethylenediamine, polyethyleneamine, cathine, isopropylamine, and a cationic lipid), biomolecule polymers (for example chitosan, polylysine, polyornithine, polyarginine, a cationic protein or peptide), and others (for example a dendritic polyamine, a polycationic polymeric or oligomeric material, and a cationic lipid-like material), or combinations of these. In some embodiments of the inventive concept the organic amine can be monoethanolamine, diethanolamine, or triethanolamine, which in cationic form can be paired with nitrate, bromide, chloride or acetate anions. In other embodiments of the inventive concept the organic amine can be lysine or glycine, which in cationic form can be paired with chloride or acetate anions. In a preferred embodiment of the inventive concept the organic amine is monoethanolamine, which in cationic form can be paired with a chlorine anion.

Such organic amines can range in purity from about 50% to about 100%. For example, an organic amine of the inventive concept can have a purity of about 50%, about 55%, about 60%, about 65%, about 70%, about 75%, about 80%, about 85%, about 90%, about 95%, about 97%, about 99%, or about 100%. In a preferred embodiment of the inventive concept the organic amine is supplied at a purity of about 90% to about 100%. It should be appreciated that organic amines can differ in their ability to interact with different members of the alkaline earth family and with contaminating species, and that such selectivity can be utilized in the recovery of multiple alkaline earths as described below.

Inventors further contemplate that zwitterionic species can be used in suitable lixiviants, and that such zwitterionic species can form cation/counterion pairs with two members of the same or of different molecular species. Examples include amine containing acids (for example amino acids and 3-aminopropanoic acid), chelating agents (for example ethylenediamine-tatraacetic acid and salts thereof, ethylene glycol tetraacetic acid and salts thereof, diethylene triamine pentaacetic acid and salts thereof, and 1,2-bis(o-aminophenoxy)ethane-N,N,N',N'-tetraacetic acid and salts thereof), and others (for example betaines, ylides, and polyaminocarboxylic acids).

Organic amines for use in lixiviants can be selected to have minimal environmental impact. The use of biologically derived organic amines, such as glycine, is a sustainable practice and has the beneficial effect of making processes of the inventive concept more environmentally sound. In addition, it should be appreciated that some organic amines, such as monoethanolamine, have a very low tendency to volatilize during processing. In some embodiments of the inventive concept an organic amine can be a low volatility organic amine (i.e., having a vapor pressure less than or equal to about 1% that of ammonia under process conditions). In preferred embodiments of the inventive concept the organic amine is a non-volatile organic amine (i.e., having a vapor pressure less than or equal to about 0.1% that of ammonia under process conditions). Capture and control of such low volatility and non-volatile organic amines requires relatively little energy and can utilize simple equipment. This reduces the likelihood of such low volatility and non-volatile organic amines escaping into the atmosphere and advantageously reduces the environmental impact of their use.

An example of an application of the inventive concept is in the isolation of insoluble calcium hydroxide, using an ammonium chloride containing lixiviant. Any source that contains a basic form of calcium can be suitable for use in a process of the inventive concept, for example steel slag, fly ash, cement kiln dust, ash, shale ash, acetylene catalyst waste, dolime, lime, low-grade lime, and calcium hydroxide. In some embodiments of the inventive concept a calcium source can be selected on the basis of high calcium content per unit mass with high levels of contamination, for example low grade lime or dolomitic lime. In other embodiments of the inventive concept. Calcium can be recovered from lime, for example low grade lime. Equation 4 represents a reaction that takes place on contacting calcium hydroxide (Ca(OH)$_2$))-containing steel slag with an ammonium chloride lixiviant.

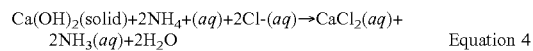

$$Ca(OH)_2(solid) + 2NH_4^+(aq) + 2Cl^-(aq) \rightarrow CaCl_2(aq) + 2NH_3(aq) + 2H_2O \qquad \text{Equation 4}$$

Calcium is extracted from the slag as soluble calcium chloride (CaCl$_2$), with the generation of uncharged ammonia (NH$_3$) and water.

A soluble alkaline earth salt, for example calcium chloride and the soluble ammonia from Equation 4 (or soluble ammonium ion if the reaction is metal oxide/hydroxide limited) can easily be separated from the insoluble solid residue, for example by filtration. Once separated, the soluble aqueous fraction can be used as-is if the target process can tolerate the small quantity of ammonia or ammonium chloride. Alternatively, the solution can be further processed as needed.

In a preferred embodiment of the inventive concept the lixiviant is regenerated and the alkaline earth calcium is recovered as an insoluble salt through the addition of carbon dioxide (CO$_2$), as shown in Equation 5. Note that aqueous CO$_2$ can be in the form of ionized carbonic acid (i.e., 2H+ plus CO$_3$2-).

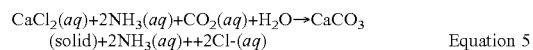

$$CaCl_2(aq) + 2NH_3(aq) + CO_2(aq) + H_2O \rightarrow CaCO_3(solid) + 2NH_3(aq) + +2Cl^-(aq) \qquad \text{Equation 5}$$

It should be appreciated that systems, methods, and compositions of the inventive concept can also be used to selectively extract and/or refine a desired alkaline earth element (such as calcium) from an ore containing other contaminants, for example other alkaline earth elements. By using the lixiviants described herein, one skilled in the art can exploit the varying degrees of basicity associated with each alkaline earth element, and choose a lixiviant of corresponding acidity to achieve selective extraction.

As noted above, in many instances the use of a low volatility and/or non-volatile lixiviant is desirable. An example of such a process of the inventive concept is the extraction of calcium (Ca) from an ore using a non-volatile organic amine, such as monoethanolamine hydrochloride, as shown in FIG. 1A to FIG. 1F. As shown in FIG. 1A, a tank 100 or other suitable arrangement includes an aqueous solution of an organic amine 110 (in this instance monoethanolamine) and a mud or slurry 120 containing calcium hydroxide (Ca(OH)$_2$ and unwanted contaminants (CONT). The solvent used can be any protic or highly polar solvent that can support the solvation of calcium salts in large amounts. Examples of suitable solvents include water, glycerol, and water glycerol mixtures. The amount of organic amine can be optimized for efficient alkaline earth extraction and minimal use of organic amine. For example, in some embodiments the amount of a monovalent organic amine can be selected to be at least about twice that of the available alkaline earth element. In preferred embodiments of the inventive concept the amount of a monovalent organic amine can be selected to be at least about 2.1 times to about 2.05 times that of the available alkaline earth element. Amounts of organic amines with greater charges can be adjusted accordingly (for example, an organic amine that forms a divalent cation can be used in at least a 1:1 ratio with the available alkaline earth element).

Reaction conditions can also be optimized by adjusting the surface area available for the reaction. Particle size of the calcium containing raw material can be reduced prior to exposure to lixiviant, for example by grinding, milling, or sifting. In some embodiments of the inventive concept the particle size can range from about 0.05 mm to about 1 mm. In other embodiments of the inventive concept the particle size can range from about 0.05 to about 0.25 mm. In a preferred embodiment the particle size can range from about 0.05 mm to about 0.125 mm.

The calcium content of the solution can also be adjusted to provide efficient extraction. In some embodiments of the inventive concept the Ca content is controlled such that the mass ratio of Ca (in terms of CaO to water) can range from about 0.02 to about 0.5. In other embodiments the mass ratio of Ca can range from about 0.05 to about 0.25. In a preferred embodiment of the inventive process the mass ratio of Ca can range from about 0.1 to about 0.15.

The extraction process can be initiated as shown in FIG. 1B by the addition of an acid form of a counterion 130, in this instance hydrochloric acid (HCl), which generates an organic acid cation/counterion pair 140 (in this instance monoethanolamine hydrochloride (MEA+/Cl—)) to form a lixiviant solution. Monoethanolamine hydrochloride (MEA.HCl, $HOC_2H_4NH_3Cl$) conforms to Compound 1 as follows: one nitrogen atom ($N_1$) is bound to one carbon atom ($R_1=C_2H_5O$) and 3 hydrogen atoms ($R_2$, $R_3$ and H), and there is one chloride counteranion ($X_1=Cl—$). The extraction process can be performed at any temperature suitable to support solvation of the alkaline earth salt formed by reaction with the organic amine cation/counterion pair. In some embodiments of the inventive concept the extraction can be performed in a temperature range of about 0° C. to about 120° C. In other embodiments of the inventive concept the extraction can be performed within a temperature range of about 20° C. to about 100° C. In a preferred embodiment of the inventive concept the extraction can be performed within a temperature range of about 20° C. and about 70° C., advantageously reducing the need for temperature control equipment.

As shown in FIG. 1C the lixiviant can enter or mix with the mud/slurry and, as shown in FIG. 1D, effectively extract an alkaline earth hydroxide, for example calcium hydroxide ($Ca(OH)_2$), by the formation of a soluble alkaline earth cation/counterion pair 150 (in this instance, calcium chloride ($Ca(Cl)_2$)). The reaction can be stirred during the extraction process in order to improve reaction kinetics. In some embodiments stirrer speeds can range from about 100 rpm to about 2000 rpm; in other embodiments of the inventive concept stirrer speeds can range from about 200 rpm to about 500 rpm. Equation 6 depicts a critical chemical reaction in such an extraction (in this case calcium, from steel slag that contains contaminants). Note that MEA.HCl dissociates in water into monoethanolammonium cation ($HOC_2H_4NH_3+(MEAH+)$) and chloride anion (Cl—). Reaction products include soluble $CaCl_2$ and uncharged monoethanolamine (MEA)).

$Ca(OH)_2(s)+2HOC_2H_4NH_3+(aq)+2Cl-(aq)CaCl_2$
$(aq)+2HOC_2H_4NH_2(aq)+2H_2O(l)$ 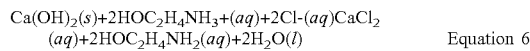 Equation 6

The extraction process can be performed for any suitable length of time, as defined by the amount and quality of the material to be processed. In some embodiments of the inventive concept the extraction can be performed for 0.5 hours to 24 hours. In other embodiments the extraction can be performed for about 30 minutes. In preferred embodiments of the inventive concept the extraction can be performed for about 15 minutes. Depending in part on the organic amine species used in the lixiviant, the pH of the solution can change during the extraction process, for example increasing as the alkaline earth element is extracted from the sample. In some embodiments of the inventive concept the pH of the solution at the beginning of the extraction can range from about 6 to about 13. In other embodiments of the inventive concept the pH at the end of the extraction step can range from about 10 to about 12.

Extraction of a sample with a lixiviant leaves insoluble materials that are not desirable in the final product. These can be removed by a variety of means, including settling, centrifugation, and filtration, as in 165 of FIG. 1D. In preferred embodiments of the inventive concept insoluble materials are removed by filtration, for example in a filter press that produces a filter cake. In order enhance the efficiency of the process, a filter cake from such a filtration can be washed to remove additional extracted calcium. In some embodiments the filter cake can be treated with a wash volume that is about 10 times that of the wetness of the filter cake. In preferred embodiments of the inventive process lower volumes can be used, for example about 5 times that of the wetness of the filter cake or about 3 times that of the wetness of the filter cake.

Following separation of the soluble fraction or supernatant from the unreacted contaminants 165, the solubilized alkaline earth element can be recovered by the addition of a precipitant 170, for example carbon dioxide ($CO_2$), as shown in FIG. 1E. The precipitant acts to form an insoluble salt with the alkaline earth element. Surprisingly, inventors have found that $CO_2$ precipitation of alkaline earth chlorides (for example, $CaCl_2$) can proceed efficiently at an acidic pH (i.e., pH<7). Addition of $CO_2$ also generates the organic amine cation/counterion pair, as shown in FIG. 1F and in Equation 7, thereby regenerating the lixiviant.

$CaCl_2(aq)+2HOC_2H_4NH_2(aq)+2H_2O(l)+$
$CO_2 \rightarrow CaCO_3(solid)+HOC_2H_4NH_3+(aq)+Cl—$ 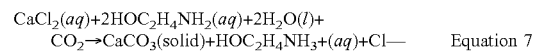 Equation 7

In the exemplary reaction the precipitant forms calcium carbonate ($CaCO_3$) 180 which, being relatively insoluble, can be easily recovered for additional processing and, if desired, recovery of calcium. For example, $CaCO_3$ can be recovered using a filter press, as described above. The regenerated lixiviant can be recycled into the process 185, advantageously reducing the overall need for lixiviant and increasing process efficiency as more raw materials containing alkaline earths are processed.

The precipitation reaction can be performed at any temperature suitable to support the solubility of the precipitating agent (for example, $CO_2$) and maintain the insolubility of the precipitated salt. In some embodiments of the inventive concept the precipitation reaction can be performed at about 4° C. to about 100° C. In other embodiments the precipitation reaction can be performed at about 20° C. to about 80° C. In preferred embodiments of the inventive concept the precipitation can be performed at about 40° C. to about 80° C. The concentration of $CO_2$ gas supplied can range from about 0.1% to about 100%. In some embodiments of the inventive concept the concentration of $CO_2$ gas can range from 10% to about 100%. This advantageously permits relatively low quality sources of $CO_2$, for example flue gas or other waste gases, to be utilized. The $CO_2$-containing gas can be applied at any rate suitable for conversion of essentially all of the calcium present to $CaCO_3$ within a suitable time, for example about 3 hours to about 4 hours. Suitable flow rates can range from 1 L/hour/mol Ca to about 100 L/hr/mol Ca. In preferred embodiments of the inventive concept the flow rate for $CO_2$ containing gas can be about 10 L/hour/mol Ca to about 20 L/hour/mol Ca. The pH of the solution can change during the precipitation reaction.

The pH of a working solution can change during the precipitation step. In some embodiments of the inventive concept, the starting pH of the solution can range from about 9 to about 12, and can range from about 6 to about 8 at the end of the precipitation. Advantageously, this pH shift can be monitored to provide an indication of the progress of a precipitation reaction. Surprisingly, inventors have found that such a $CO_2$ precipitation of alkaline earth chlorides (for example, $CaCl_2$) in this process can proceed efficiently at an acidic pH (i.e., pH<7). The precipitation reaction can be performed until a suitable endpoint is reached. For example, in some embodiments the precipitation can be performed until the pH of the reaction remains below a specified setpoint (for example, a pH of about 8) for at least about 15 minutes.

Separation of the precipitate can be accomplished by any suitable method, including removing the soluble fraction from the tank 100 (for example, by decanting, pumping, or siphoning), filtration, centrifugation, or a combination of these. In a preferred embodiment the precipitate is removed using a filter press. The resulting filter cake can be easily recovered for additional processing and, if desired, recovery of calcium. The regenerated lixiviant can be recycled into the next iteration of the process 185, advantageously reducing the overall need for lixiviant and increasing process efficiency as more raw materials containing alkaline earths are processed.

It should be noted that the choice of lixiviant can allow for the selective extraction of calcium in this example because it does not react with other metals (ME) or metal oxides/hydroxides ($MEO_x$) in the alkaline earth source material, as shown in Equation 8 and Equation 9.

$$ME(s)+HOC_2H_4NH_3+(aq) \rightarrow \text{NO REACTION} \qquad \text{Equation 8}$$

$$MEO_x(s)+HOC_2H_4NH_3+(aq) \rightarrow \text{NO REACTION} \qquad \text{Equation 9}$$

The soluble calcium salt and the soluble MEA from Equation 6 can easily be separated from the insoluble solid residue. Once separated, the soluble aqueous fraction can used as-is if the target process can withstand the small quantity of lixiviant as a contaminant, or the solution can be furthered processed as needed.

In an alternative embodiment of the inventive concept, a solution containing an alkaline earth cation/counterion complex as shown in Equation 6 can be concentrated or diluted to a desired strength as required by the end user. Alternatively, such a solution can be boiled down or evaporated completely, leaving an alkaline earth element cation/counterion salt and/or various hydrates thereof, depending on how vigorously the mixture is dried. The residual uncharged organic amine could also be removed by this process and optionally captured for reuse. The dried alkaline earth element chlorides could be further processed into oxides via thermal oxidation, precipitation with agents such oxalic acid, sodium hydroxide, potassium hydroxide or other precipitating agents.

There are of course many possible lixiviants of the form of Compound 1, and there are likewise many alkaline earth element sources. While the examples provided have described the action of two organic amine lixiviants (i.e., ammonium chloride and monoethanolamine hydrochloride (a.k.a. monoethanolammonium chloride) with one particular source (steel slag) of a particular alkaline earth element (calcium) other examples of process of the inventive concept can utilize organic amine cation/counterion pairs such as ammonium acetate, monoethanol-ammonium acetate, ammonium nitrate, or monoethanolammonium nitrate. Alternatively, biologically derived lixiviants such as the amino acid glycine (or a salt of itself) or the hydrobromide salt of poly-L-lysine can be used. Similarly, while examples note the use of steel slag, other sources (such as calcite, dolomite, gypsum, plagioclases, amphiboles, pyroxenes and garnets) are suitable. Alternatively, systems, methods, and compositions of the inventive concept can be utilized to recover alkaline earth elements from agricultural waste, consumer waste, industrial waste, scrap or other excess materials from manufacturing processes, or other post-utilization sources.

Many alkaline earth elements can form hydroxides; most of these have very limited solubility in water. These hydroxides also have varying degrees of basicity. While calcium hydroxide as produced from various mineral sources has been cited as an example there are many other alkaline earth elements that form suitable bases in water. Examples of other elements that, in hydroxide form, are suitable for use in systems and methods of the inventive concept include beryllium, magnesium, strontium, barium, and radium. Such salts have different basicities, which can be paired with organic amine based lixiviants of different acidities to provide selective recovery.

It should also be noted that systems, methods, and compositions of the inventive concept are not limited to one alkaline earth species being extracted with one particular lixiviant or set of anions. Multiple alkaline earth species with various organic amine based lixiviants and various anions (or acids) can be used in sequence or in parallel to extract a particular mixture of metals or to produce a particular mixture of metal salts.

As described above, lixiviants of the inventive concept can be applied in a variety of methods. Examples of some of these methods are depicted schematically in FIG. 2, FIG. 3, and FIG. 4.

Figure 2:
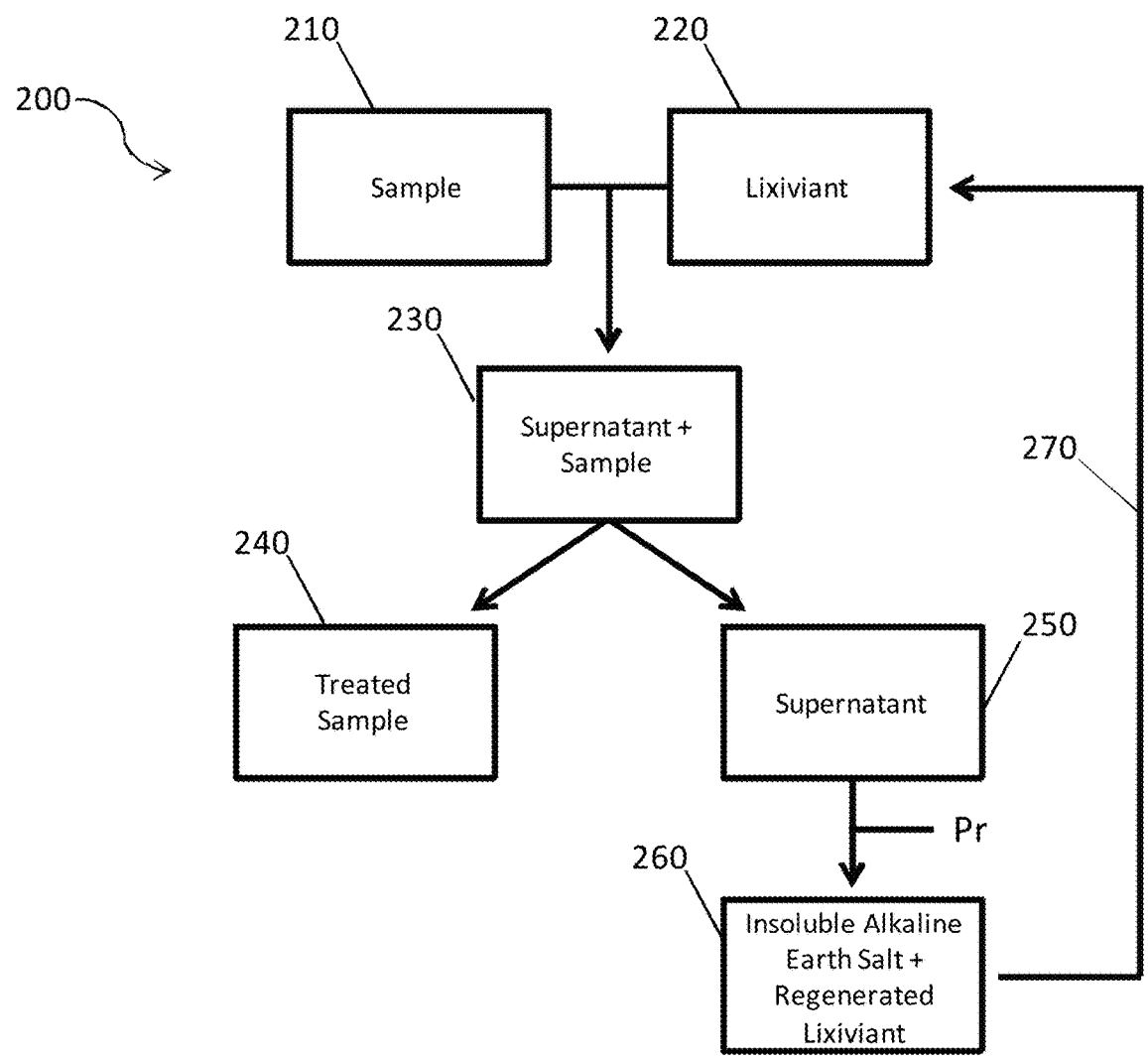
FIG. 2 schematically depicts a method of the inventive concept, in which a alkaline earth elements is recovered from a sample using a lixiviant, which is regenerated.

FIG. 2 depicts a method of the inventive process 200 in which a sample 210, for example an ore, mineral, or other source of an alkaline earth element, is mixed with a lixiviant 220. The lixiviant can include one or more organic amine species as described above in the form of a cation, coupled with a suitable counterion. Suitable counterions can include halides. In a preferred embodiment of the inventive concept the counterion is chloride (Cl—).

A sample 210 can be a calcium-containing ore (for example dolomite or gypsum), a byproduct of a manufacturing process (for example, steel slag), or any suitable calcium source. The sample 210 can be treated prior to mixing with the lixiviant 220. For example, the components of the sample 210 can be reduced in size, for example through milling, grinding, pulverizing, or sifting. Such processes improve the surface area to volume ratio of elements of the sample and can serve to increase reaction rates. In some embodiments a sample can be chemically treated, for example through exposure to strong bases (such as sodium hydroxide) or oxidized through exposure to air at elevated temperatures. Such chemical treatments can serve to generate alkaline earth metal salts (for example, hydroxides or oxides) and to alter the physical structure of the sample or components of the sample.

On interacting with the lixiviant 220, alkaline earth elements in the sample interact with organic amine cations and counterions to form a soluble alkaline earth element cation/counterion complex that is solubilized in the supernatant 230, along with an uncharged organic amine. The pH of this portion of the reaction process can be alkaline, i.e., ranging from about 7.5 to about 14. In some embodiments of the inventive concept the pH can range from about 10 to about 12. Unwanted contaminants are not solvated, and remain behind as insoluble material, for example as a treated sample 240 that can be further processed if desired.

The supernatant 250 can be separated from the insoluble materials of the treated sample 240 by a variety of processes, including settling, filtration, or centrifugation, either alone or in combination. The alkaline earth cation 260 can be recovered from the supernatant 250 by any suitable means, including electrodeposition, precipitation, and ion exchange. In a preferred embodiment of the inventive concept the alkaline earth cation is recovered by the addition of a precipitant (Pr) to produce an insoluble alkaline earth salt that is easily recovered. Such precipitants can be an H+ donating species suitable for forming insoluble salts of alkaline earth elements while regenerating an organic amine cation, for example $CO_2$ or carbonic acid, chromic acid, or sulfuric acid. In a preferred embodiment of the inventive concept the precipitant (Pr) is $CO_2$ or carbonic acid. Surprisingly, inventors have found that this precipitation can be performed at a pH of less than 7. In such an embodiment a precipitation step can be performed at a pH between about 6 and about 7. In a preferred embodiment a precipitation step can be performed at a pH of about 6.7. The uncharged organic amine remaining in the supernatant 250 can, in turn, be regenerated 270 in this process to form an organic amine cation that can form part of a lixiviant 220 that can be used in the next iteration of the reaction. This recycling of the lixiviant greatly reduces consumption through multiple cycles of the process and advantageously reduces environmental impact and expense.

Figure 3:
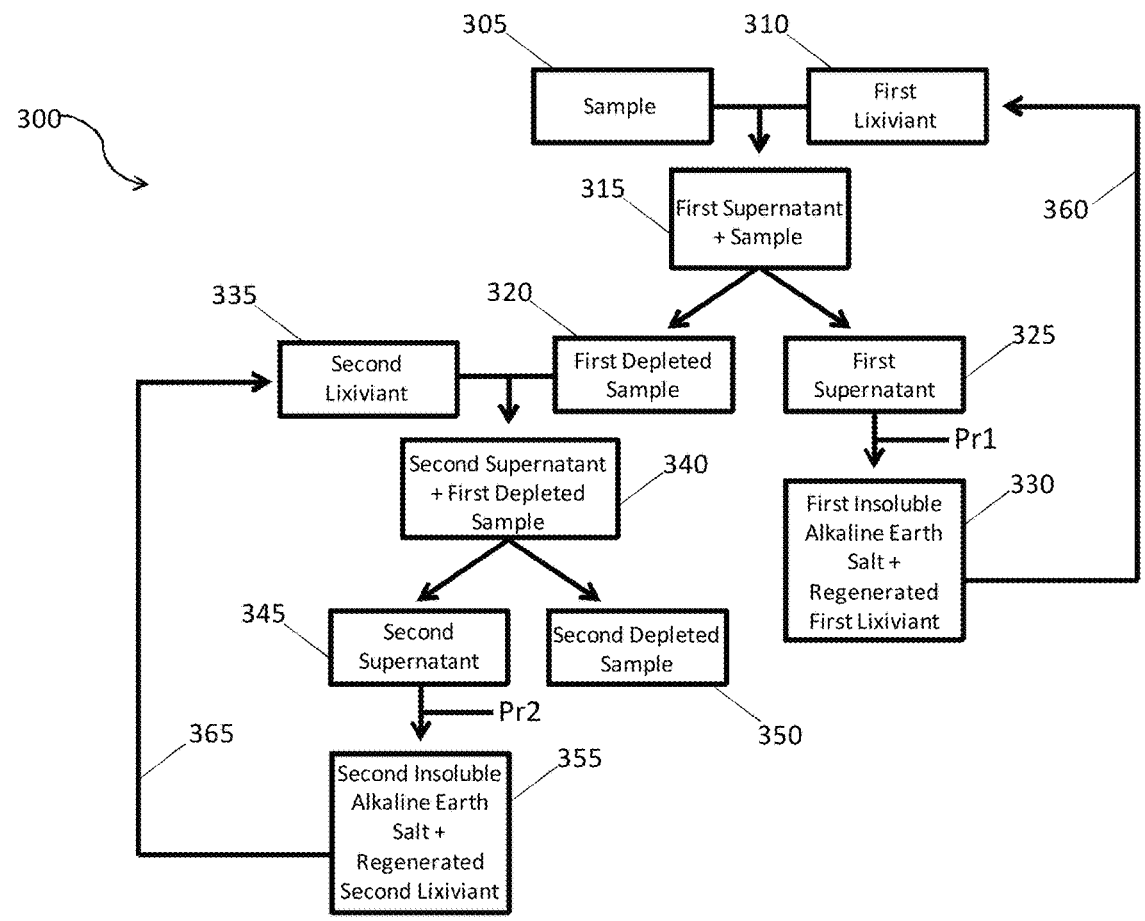
FIG. 3 schematically depicts another method of the inventive concept, in which different alkaline earth elements are recovered in a stepwise fashion.

Other embodiments of the inventive concept can advantageously utilize the selective complex formation and solubility of components of methods of the inventive concept to recover different alkaline earth elements from the same sample. One example of such a method is shown in FIG. 3. As shown, such a method can be a chain of reactions that are, essentially, one or more repetitions of the method shown in FIG. 1 applied to a progressively depleted sample. In an example of such a method 300, a sample 305 and a first lixiviant 310 are brought into contact with each other. The first lixiviant 310 includes a first organic amine cation and a counterion, and reaction 315 with the sample 305 produces a first depleted sample 320 and a first supernatant 325 that includes a first alkaline earth cation, a counterion, and an uncharged organic amine. The first depleted sample 320 includes materials that were not reactive with the first lixiviant, which can include additional alkaline earth elements, other valuable materials, and unwanted contaminants. It can be separated from the first supernatant 325 by any suitable method, including settling, filtration, and centrifugation, either alone or in combination. The first alkaline earth cation can be recovered from the first supernatant 325 by any suitable means, including electrodeposition, precipitation, and ion exchange. In a preferred embodiment of the inventive concept a first precipitant (Pr1) can used that generates an insoluble first alkaline earth salt and regenerates the first organic amine cation/counterion pair 330. In such an embodiment the uncharged first organic amine remaining in the supernatant 325 can, in turn, be regenerated 360 to give a first organic amine cation that can form part of a first lixiviant 310 that can be used in the next iteration of the process.

The first depleted sample 320 can, in turn, be contacted 340 with a second lixiviant 335 that includes a second organic amine cation/counterion pair. Reaction with the first depleted sample 240 produces a second depleted sample 350 and a second supernatant 345 that includes a soluble second alkaline earth element cation/counterion complex and uncharged second organic amine. The second alkaline earth cation can be recovered from the second supernatant 345 by any suitable means, including precipitation, electrodeposition, and/or ion exchange. In a preferred embodiment of the inventive concept a second precipitant (Pr2) can used that generates an insoluble second alkaline earth salt and regenerates the second organic amine cation/counterion pair 355.

Such precipitants can be an H+ donating species suitable for forming insoluble salts of alkaline earth elements while regenerating an organic amine cation, for example $CO_2$ or carbonic acid, chromic acid, or sulfuric acid. The regenerated second organic amine/counterion pair can in turn be recycled 365 for use in the next iteration of the process. In some embodiments of the inventive concept the first precipitant and the second precipitant are the same species. In other embodiments of the inventive concept the first precipitant and the second precipitant are different species. In a preferred embodiment of the inventive concept the first precipitant and the second precipitant are $CO_2$ or carbonic acid. In some embodiments of the inventive concept the second depleted sample 350 is subjected to further rounds of treatment with lixiviants in order to recover additional valuable materials. This recycling of the lixiviants advantageously reduces the overall amount of organic amines used as the process is repeated, which limits both the environmental impact of such operations and permits considerable savings in materials.

Figure 4:
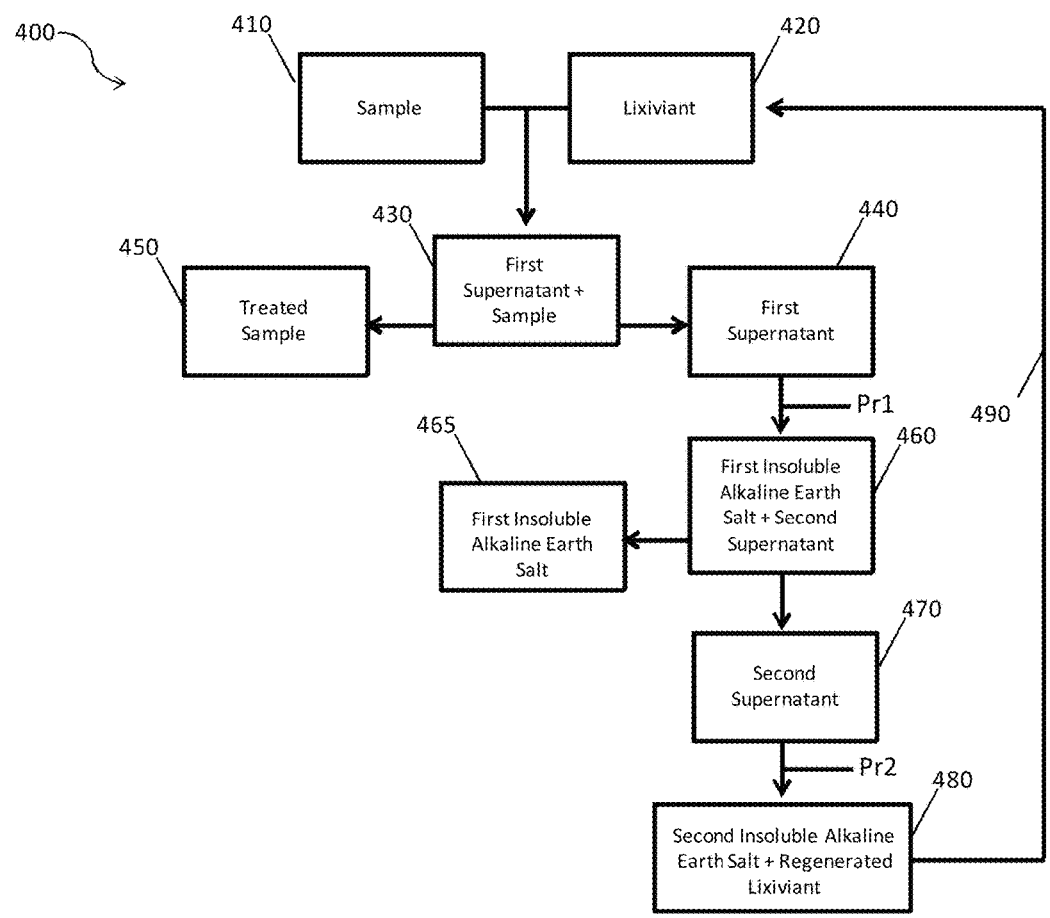
FIG. 4 schematically depicts an alternative embodiment of the inventive concept, in which different alkaline earth elements are recovered in a stepwise manner.

Another embodiment of the inventive concept that permits recovery of two or more alkaline earth elements from a sample is shown in FIG. 4. In such a method 400 a sample 410 is contacted with a lixiviant 420 that includes a first organic amine cation/counterion pair and a second organic amine cation/counterion pair. This mixture 430 results in a treated sample 450 and a first supernatant 440. This first supernatant can include a first alkaline earth element cation/counterion pair, a second alkaline earth element cation/counterion pair, a first uncharged organic amine, and a second uncharged organic amine. The first alkaline earth cation 460 can be recovered from the first supernatant 440 by any suitably selective means, including precipitation, electroplating, or ion exchange. In a preferred embodiment of the inventive concept, the first alkaline earth element can be recovered by adding a first precipitant (Pr1) that selectively forms an insoluble salt of the first alkaline earth element 460. For example, in a sample containing a mixture of magnesium and calcium, the calcium can be recovered in this step of the reaction by the addition of chromic acid as a first precipitant (P1) to form relatively insoluble calcium chromate ($CaCrO_4$); relatively soluble magnesium chromate ($MgCrO_4$) would remain in solution.

Recovery of the second alkaline earth cation from the second supernatant 470 also yields a regenerated lixiviant. The second alkaline earth cation can be recovered from the second supernatant 470 by any suitable means, such as precipitation, electrodeposition, or ion exchange. In a preferred embodiment of the inventive concept, the second alkaline earth element can be recovered by adding a second precipitant (Pr2) that forms an insoluble salt of the second alkaline earth element and completes regeneration of the lixiviant 480. For example, in a sample containing a mixture of magnesium and calcium, the magnesium can be recovered in this step of the reaction from a supernatant resulting from chromic acid treatment by the addition of $CO_2$ or carbonic acid as a second precipitant (P2) to form relatively insoluble calcium carbonate ($CaCO_3$). The regenerated lixiviant can in turn be recycled 490 in the next iteration of the process.

In some embodiments of the inventive concept the first organic amine and the second organic amine (and their respective cations) can be different molecular species with different acidities and/or specificities for alkaline earth elements. In other embodiments of the inventive concept the first organic amine and the second organic amine can be the same molecular species, with selectivity between the first alkaline earth element and the second alkaline earth element being provided by the method used for their recovery from supernatants. For example, utilization of different precipitating species, utilization of the same precipitating species under different conditions (for example, concentration, temperature, pH, or a combination of these), utilization of ion exchange media with different selectivities, or combinations of these approaches can be used to provide selective recovery of the alkaline earth elements of a sample. It should be appreciated that, as described in the processes illustrated in FIG. 2 and FIG. 3, that regeneration and re-use of the lixiviant through repeated iterations advantageously reduces the amount of organic amine needed, which limits both the environmental impact of such operations and permits considerable savings in materials.

Figure 6:
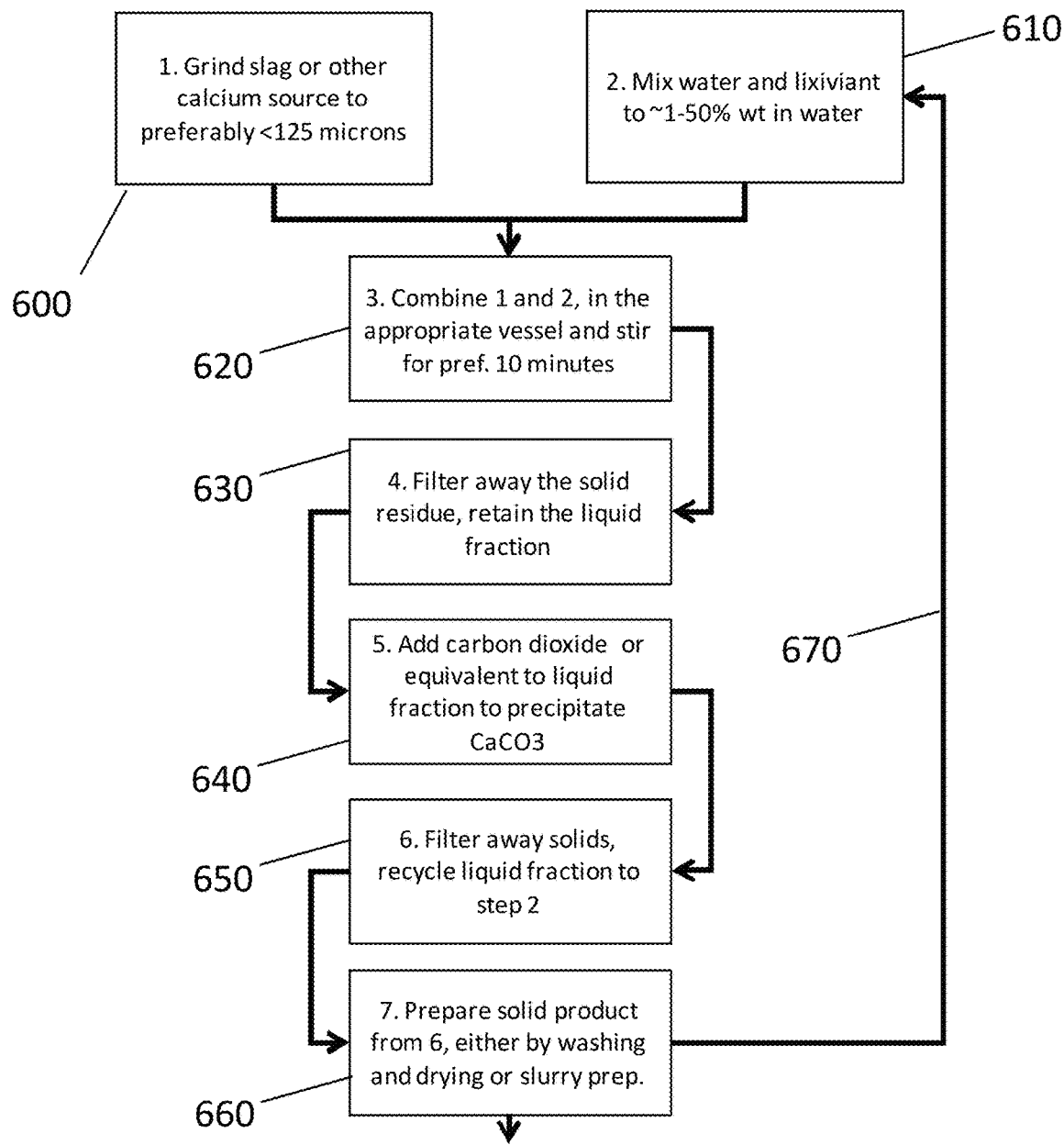
FIG. 6 schematically depicts processing of a steel slag by a method of the inventive concept.

A specific example of the recovery of calcium from steel slag is shown in FIG. 5 and FIG. 6. FIG. 5 shows the composition of a typical steel slag, showing a complex mixture of various metal oxides including calcium oxide (CaO), which becomes calcium hydroxide ($Ca(OH)_2$) on exposure to water. Processing of such a steel slag is shown diagrammatically in FIG. 6. Initially, steel slag (or an alternative calcium source) is ground 600 to less than around 125 μm. This greatly increases the surface area available for reaction. Water and lixiviant are mixed 610 in a suitable ratio, which can range from 1% to about 50%. The ground slag and aqueous lixiviant are mixed 620 and stirred or agitated for a time sufficient to form the calcium cation/counterion pair, in this instance approximately 10 minutes. The solid residue, which is depleted of calcium, is removed by filtration 630 and the liquid fraction or supernatant is processed by adding carbon dioxide (or an equivalent, such as carbonic acid) to precipitate calcium carbonate ($CaCO_3$) 640. This process also regenerates the lixiviant. The $CaCO_3$ can then be prepared for further processing by washing, dilution into a slurry, and so on 660, while the regenerated lixiviant is recycled for re-use in the next iteration of the process 670.

Figure 7A:
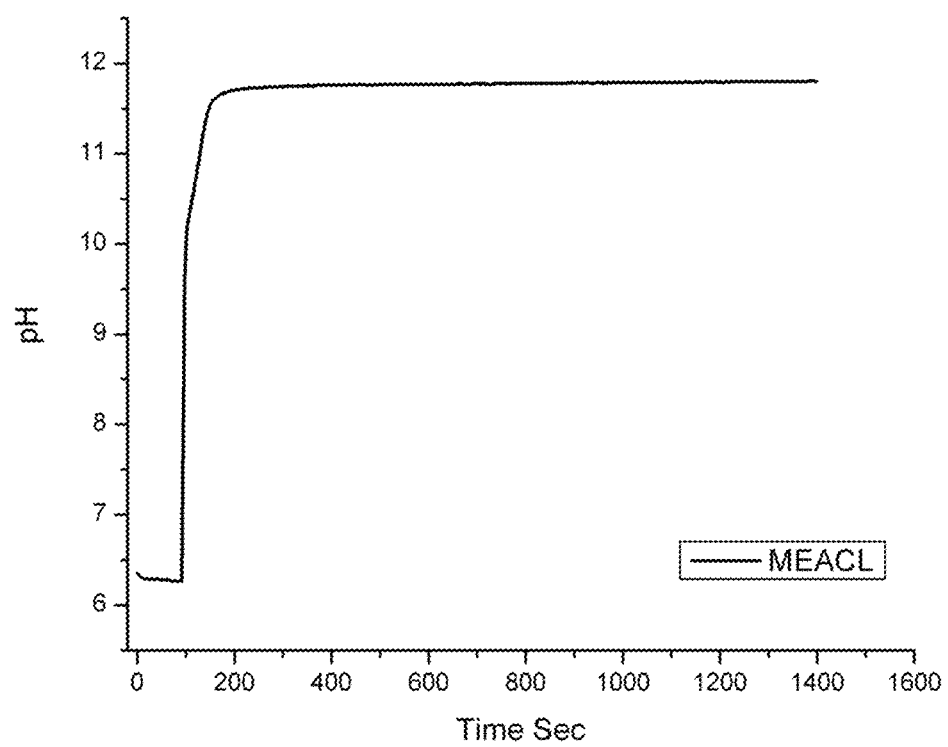
FIG. 7A-D show the results of systems, methods, and compositions of the inventive concept.
Figure 7B:
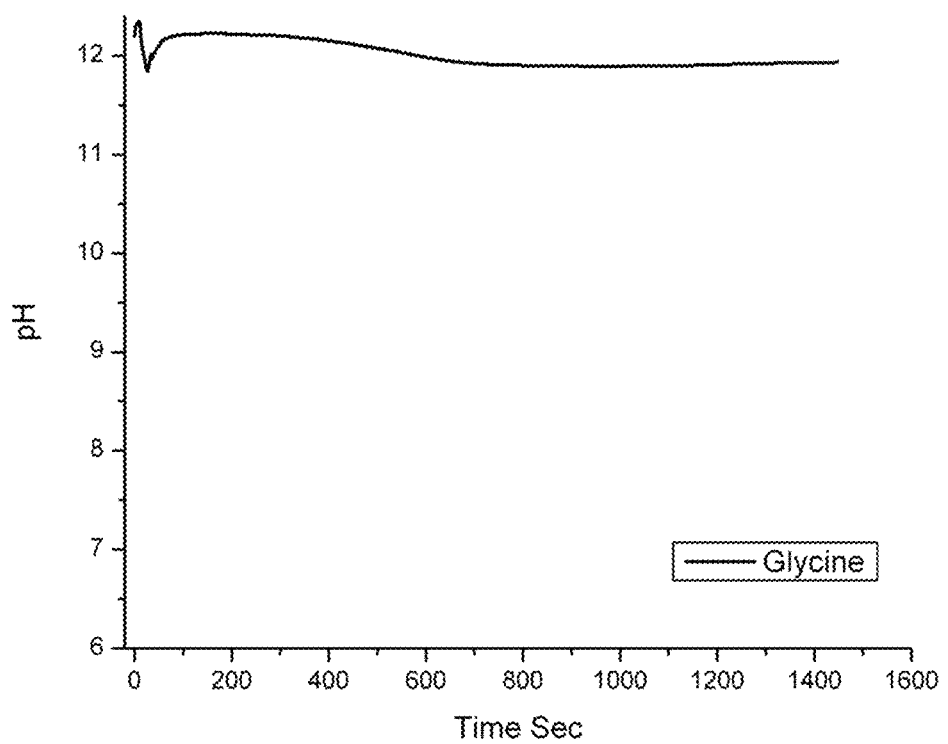
Figure 7C:
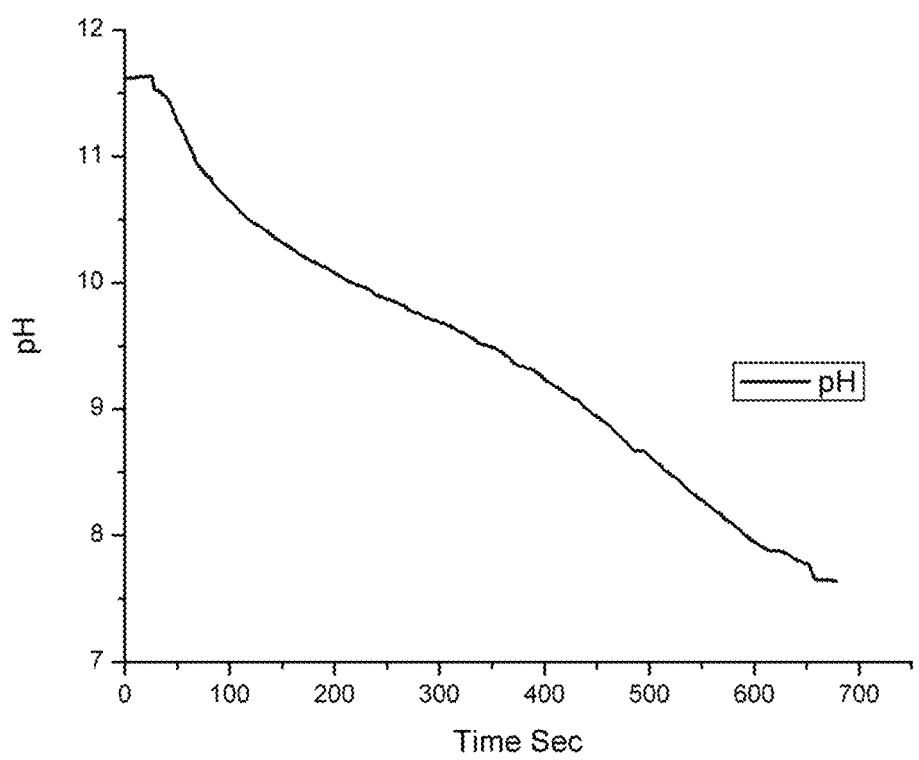

Examples of the recovery of calcium by systems, methods, and compositions of the inventive concept are shown in FIG. 7A through FIG. 7D. FIG. 7A shows the change in pH over time as calcium is extracted from low-grade lime using monoethanolamine-HCl (MEACL) as the organic amine lixiviant. In this reaction 5 grams of low-grade lime was mixed with 50 grams of water containing the lixivant at a lixiviant to calcium molar ratio of 2.1:1, while stirring 400 rpm. The reaction was allowed to proceed for 23 minutes. FIG. 7B shows the results of a similar study, in which the pH was monitored over time as calcium is extracted from low-grade lime using glycine as the organic amine lixiviant. It should be appreciated that as an amino acid glycine can be advantageously derived from biological sources and that, due to its zwitterionic nature, glycine can act as its own counterion. In this reaction 5 grams of low-grade lime was mixed with 50 grams of water containing the lixiviant at a lixiviant to calcium molar ratio of 2.1:1, while stirring at 400 rpm. The reaction time was allowed to proceed for 24 minutes. FIG. 7C shows the results of recovery of extracted calcium using a precipitant, in this instance $CO_2$. In this example pH was monitored as $CO_2$ was perfused through calcium extracted from low grade lime using monoethanolamine-HCl as the lixiviant. The reaction was performed for 11 minutes as 100% $CO_2$ was perfused through the solution at 20 mL per minute at a temperature of 22° C., while stirring at 400 rpm.

Figure 7D:
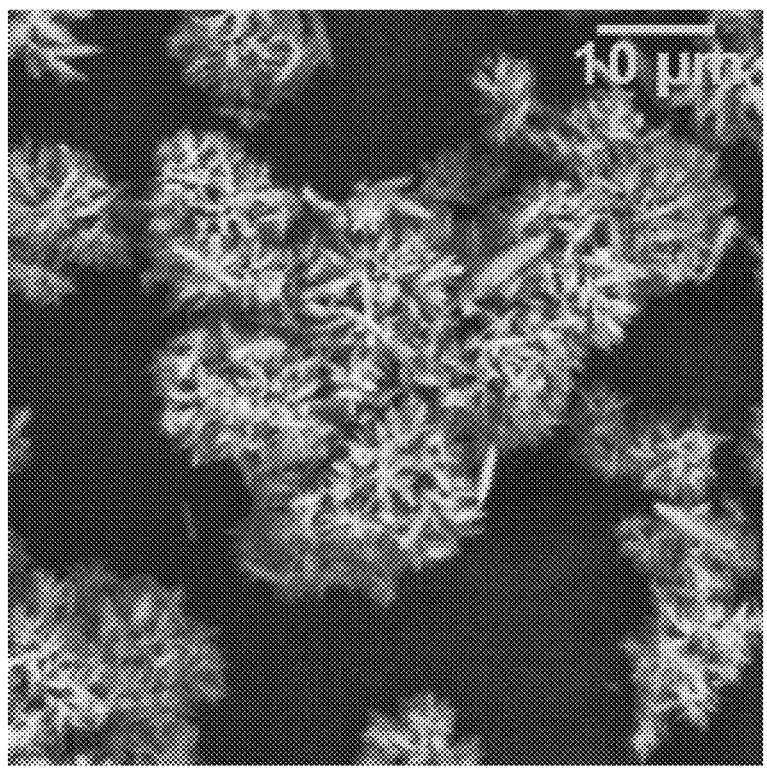

A photomicrograph of an exemplary product from the extraction of calcium using systems, methods, and compositions of the inventive concept is shown in FIG. 7D. The reaction was performed using 10 grams low-grade (~50% CaO content) lime, which was treated with 19.7 grams of monoethanolamine-HCl in 100 grams water and stirred at 400 rpm for 30 minutes. Solid residue was removed by filtration and the filtrate perfused with 100% $CO_2$ at a flow rate of 20 mL/min at a temperature of 60° C., until the pH was less than 8 for 15 minutes. The yield of precipitated calcium carbonate (PCC) was 86%.

Figure 8A:
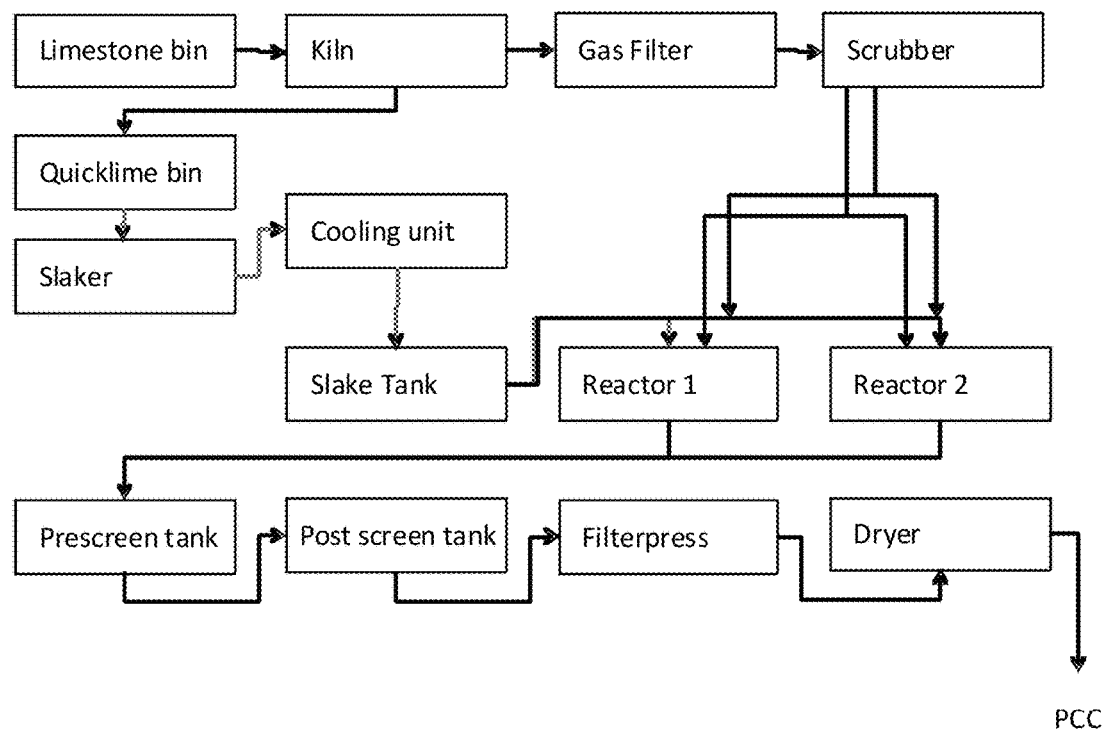
FIGS. 8A-E show a prior art commercial plant and a commercial plant adapted to utilize a process of the inventive concept.
Figure 8B:
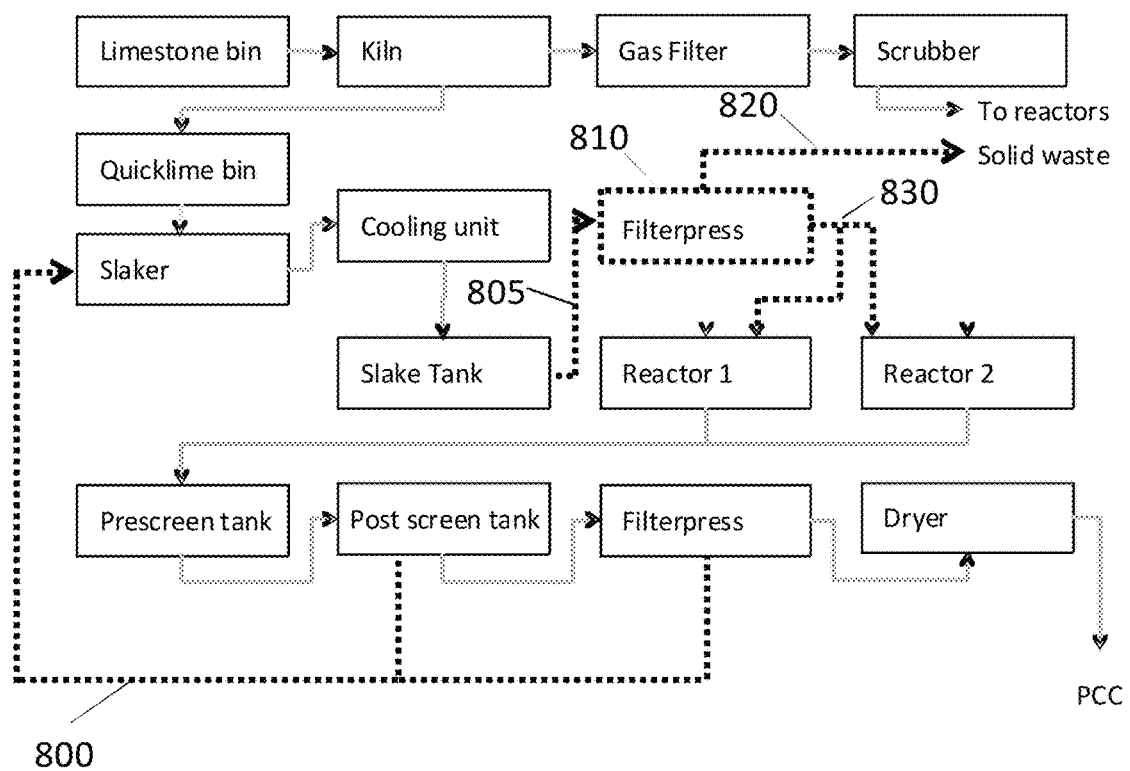

As shown in FIG. 8A and FIG. 8B, the processes of the inventive concept can advantageously be readily adapted to the infrastructure of current processing plants. FIG. 8A shows a schematic of typical components and material transfers of a commercial powdered calcium carbonate (PCC) plant. Limestone is received in a limestone bin and calcined in a kiln to produce calcium oxide. Flue gases from the kiln are processed in a gas filter and scrubber. Calcium oxide from the kiln is transferred to a quicklime bin, and then to a slaker where it is mixed with water to produce calcium hydroxide. Calcium hydroxide from the slaker is transferred to a cooling unit to remove heat from this exothermic process, and subsequently transferred to one or more reactors. The reactors receive $CO_2$, part of which can be recovered from flue gas by the scrubber, and mix it with the calcium hydroxide suspension. $CO_2$ forms carbonic acid in the water of the suspension and slowly reacts with the solids of the calcium hydroxide suspension to produce calcium carbonate. The solid calcium carbonate is transferred to a postscreen tank and then a postscreen tank, and finally to a filter press in order to remove unreacted material and a portion of the water. Material recovered by the filter press is transferred to a dryer for thorough removal of water to generate the powdered calcium carbonate product.

Figure 8C:
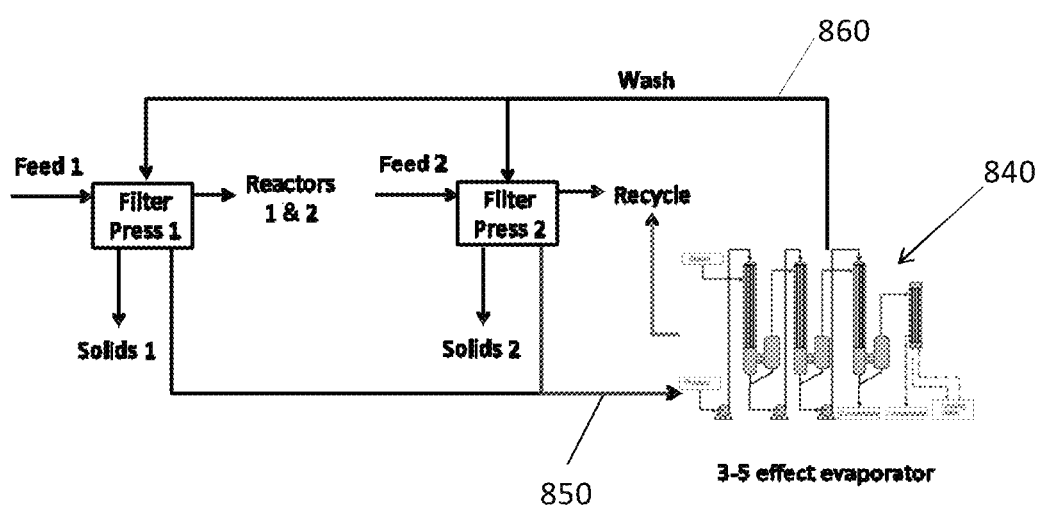

The arrangement and nature of the components in such a conventional plant allows adaptation to lixiviant-based methods with minimal disruption, as shown in FIG. 8B. As shown, new components and material transfer paths are shown with dotted lines. In the modified plant, the slaker receives a water/lixiviant mixture 800, which reacts with the calcium hydroxide formed in the slaker to form a soluble calcium ion/counterion complex that can be transferred to a cooling unit and subsequently to a filterpress 810 that separates unreacted material 820 from the calcium-containing solution, which is transferred 830 to one or more reactors. Reaction with carbon dioxide, part of which can be obtained from the flue gas scrubber associated with the kiln, rapidly generates calcium carbonate in a solution-phase reaction, in the process regenerating the lixiviant. This regenerated lixiviant can be retrieved from the post screen tank and returned to the slaker for the next iteration of the process. FIG. 8C shows how a multi (for example, 3 to 5) effect evaporators 840 can be added to the effluent lines 850 from the filter presses of a lixiviant-adapted plant to concentrate regenerated lixiviant for re-use and to recover solvent (for example, water) 860 for use in washing the calcium carbonate produced by the process, in order to adjust and optimize the lixiviant concentration while reducing material costs.

Figure 8D:
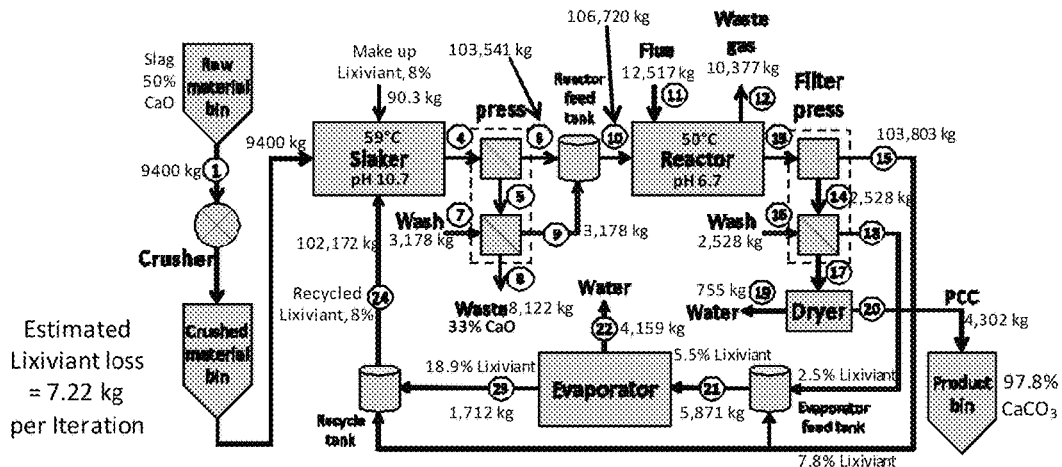
Figure 8E:
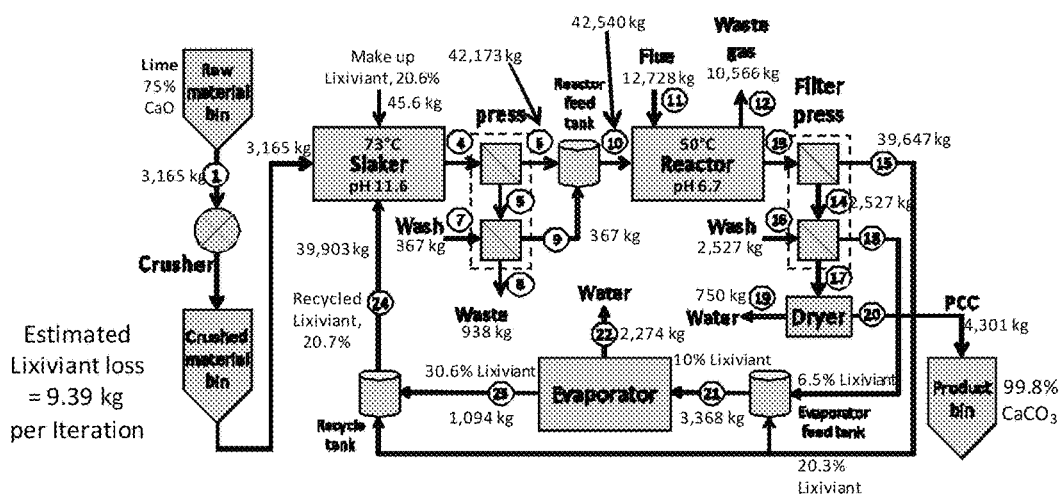

Advantageously, efficiencies of plants operated in such a manner can be very high, as shown in FIGS. 8D and 8E. FIG. 8D shows mass balances for a typical iteration of a calcium isolation from steel slag. Only 7.22 kg of lixiviant is lost for 4,301 kg of 97.8% calcium carbonate produced. Over 99.9% of the lixiviant used in such a reaction is recycled from previous iterations. Similarly, FIG. 8E shows mass balances for a typical iteration of a calcium isolation from lime. Only 9.39 kg of lixiviant are lost for 4,301 kg of 99.8% pure calcium carbonate produced. Over 99.85% of the lixiviant used in such a reaction is recycled from previous iterations.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method for extracting an alkaline earth element, comprising:
    contacting a sample comprising a first alkaline earth element with an uncharged first lixiviant precursor comprising an uncharged organic amine;
    mixing the sample with the first lixiviant precursor;
    after mixing the sample with the first lixiviant precursor, generating a first lixiviant comprising a first organic amine cation and a first counterion from the first lixiviant precursor by addition of an acid form of the first counterion;
    forming a depleted sample and a first supernatant comprising a first uncharged organic amine, and a first soluble complex comprising a cation of the first alkaline earth element and the first counterion;
    transferring the first alkaline earth element cation from the first supernatant; and
    regenerating the first organic amine cation by the addition of a first precipitant, wherein the first organic amine cation comprises carbon.

2. The method of claim 1, wherein the pH during regeneration of the organic amine cation is less than about 7.

3. The method of claim 1, wherein the pH during regeneration of the organic amine cation is greater than 6 and less than 7.

4. The method of claim 1, wherein the organic amine has a pKa between 8 and 14.

5. The method of claim 4, wherein the organic amine cation is derived from a biological source.

6. The method of claim 1, wherein the lixiviant is formed by adding an acid to the first lixiviant precursor in the presence of the sample.

7. The method of claim 1, wherein the regenerated organic amine cation is treated using a multi-effect evaporator.

8. The method of claim 1, further comprising a step of using at least a portion of the regenerated organic amine cation to contact a sample comprising an alkaline earth element.

9. The method of claim 1, wherein the first precipitant is carbon dioxide or carbonic acid.

10. A method of claim 1, wherein the sample comprises a second alkaline earth element, and comprising the additional steps of:
    contacting the depleted sample with a second lixiviant, the second lixiviant comprising a second organic amine cation and a second counterion and wherein the second lixiviant is selective for the second alkaline earth element;
    forming a second supernatant comprising an uncharged second organic amine and a second complex comprising a second alkaline earth element cation and the second counterion; and,
    transferring the second alkaline earth cation from the depleted sample; and,
    regenerating the second organic amine cation by the addition of a second precipitant.

11. The method of claim 10, wherein the first alkaline earth element is precipitated by the first precipitant.

12. The method of claim 10, wherein the first precipitant is carbon dioxide or carbonic acid.

13. The method of claim 10 wherein the second alkaline earth element is precipitated by the second precipitant.

14. A method for extracting alkaline earth elements, comprising:
    contacting a sample comprising a first alkaline earth element and a second alkaline earth element with a lixiviant, the lixiviant comprising a first organic amine cation, a second organic amine cation, and a counterion, wherein the first organic amine cation is selective for the first alkaline earth element and the second organic amine cation is selective for the second alkaline earth element;
    forming a first supernatant comprising an uncharged first organic amine, an uncharged second organic amine, a first complex comprising a first alkaline earth metal cation and the counterion, and a second complex comprising a second alkaline earth metal cation and the counterion;
    transferring the first alkaline earth metal cation from the first supernatant to form a second supernatant;
    transferring the second alkaline earth metal cation from the second supernatant and,
    regenerating the first organic amine cation and the second organic amine cation from the second supernatant, wherein the first organic amine cation is regenerated by the addition of a first precipitant.

15. The method of claim 14, wherein the first organic amine cation and the second organic amine cation are different species.

16. The method of claim 14, wherein the first alkaline earth element is precipitated from the first supernatant by the addition of the first precipitant.

17. The method of claim 14, wherein the second alkaline earth element is precipitated from the second supernatant by the addition of a second precipitant.

18. The method of claim 17, wherein the second precipitant is $CO_2$ or carbonic acid.

* * * * *